(12) United States Patent
Okamura et al.

(10) Patent No.: US 8,935,010 B1
(45) Date of Patent: Jan. 13, 2015

(54) POWER DISTRIBUTION WITHIN HIGH-POWER NETWORKING EQUIPMENT

(75) Inventors: Katsuhiro Okamura, Watsonville, CA (US); Nathan Berg, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 450 days.

(21) Appl. No.: 13/324,821

(22) Filed: Dec. 13, 2011

(51) Int. Cl.
*G06F 19/00* (2011.01)

(52) U.S. Cl.
USPC .......................................... 700/286; 361/762

(58) Field of Classification Search
USPC ............ 700/286; 361/726, 20, 274, 740, 728; 312/223.2; 398/49; 370/218; 709/203, 709/223, 201; 713/117, 191
See application file for complete search history.

(56) References Cited

U.S. PATENT DOCUMENTS

| | | | | |
|---|---|---|---|---|
| 5,694,312 | A * | 12/1997 | Brand et al. | 363/144 |
| 6,324,608 | B1 * | 11/2001 | Papa et al. | 710/104 |
| 6,583,989 | B1 * | 6/2003 | Guyer et al. | 361/724 |
| 7,299,368 | B2 * | 11/2007 | Peker et al. | 713/300 |
| 7,373,527 | B2 * | 5/2008 | Chapuis | 713/300 |
| 7,467,309 | B2 * | 12/2008 | Templeton | 713/300 |
| 7,560,825 | B2 * | 7/2009 | Crawley | 307/1 |
| 7,685,452 | B2 * | 3/2010 | Camagna et al. | 713/340 |
| 7,707,443 | B2 * | 4/2010 | Chheda et al. | 713/322 |
| 7,779,276 | B2 * | 8/2010 | Bolan et al. | 713/300 |
| 8,050,559 | B2 | 11/2011 | Sindhu | |
| 8,107,225 | B2 * | 1/2012 | Rasmussen et al. | 361/601 |
| 8,384,244 | B2 * | 2/2013 | Peterson et al. | 307/66 |
| 2004/0231875 | A1 * | 11/2004 | Rasmussen et al. | 174/50 |
| 2005/0122140 | A1 * | 6/2005 | Peker et al. | 327/108 |
| 2007/0109736 | A1 * | 5/2007 | Coglitore | 361/683 |
| 2007/0236853 | A1 * | 10/2007 | Crawley | 361/119 |
| 2008/0222435 | A1 * | 9/2008 | Bolan et al. | 713/310 |
| 2011/0304211 | A1 * | 12/2011 | Peterson et al. | 307/48 |

OTHER PUBLICATIONS

Brian Mordick, Data Center Cabinet Dynamics, Sep. 2006, Hoffman, p. 1-16.*
Dave Olson, Hot Swap Power Management, Texas Instrument Incorporation, 2001, 1-14.*

* cited by examiner

*Primary Examiner* — Kidest Bahta
(74) *Attorney, Agent, or Firm* — Shumaker & Sieffert, P.A.

(57) ABSTRACT

This disclosure describes techniques for managing a power supply for hot-swappable components of a high-power networking device. According to these techniques, a high-power networking device includes a power distribution module (PDM). The PDM is receive a high-voltage, high-power supply input, generate supply plurality of high-power, reduced voltage supplies, and distribute the plurality of high-power reduced voltage supplies to a plurality of hot-swappable components of the high-power networking system via an intermediate distribution plane.

25 Claims, 5 Drawing Sheets

POWER DISTRIBUTION WITHIN HIGH-POWER NETWORKING EQUIPMENT

TECHNICAL FIELD

The disclosure relates to power distribution within high power networking equipment.

BACKGROUND

Modern networks include a variety of networking equipment, such as routers, switches, gateways, servers, or the like. This equipment is becoming increasing complex as higher and higher bandwidth, speed and capacity levels are required. Many of the devices are implemented with distributed architectures having a large number of hot-swappable, redundant components and consume significant power. For example, a high-end network device may constantly require high-power on the order of 10,000 watts, 20,000 watts or more. As a result, the devices utilize complex internal power distribution architectures in which a high-voltage power supply is distributed to the internal components. Numerous intermediate high-voltage power distribution circuits are typically used throughout the device to distribute the high-voltage power.

SUMMARY

As set forth above, for a typical high-end network device, components of the device, (e.g., hot-swappable networking components) may themselves include or be coupled to one or more intermediate power distribution circuits. Such a hot-swappable component power distribution arrangement may require the replacement or repair of a hot-swappable component in the even of power distribution circuit disruption or failure. During repair and/or replacement, such a hot-swappable component may not be useable by the high-end network device to provide networking functionality.

In general, this disclosure describes techniques for managing a power supply for hot-swappable components of a high-power networking device. According to these techniques, instead of one or more intermediate power distribution circuits as described above, a high-power networking device includes a power distribution module (PDM). The PDM is configured to receive a high-voltage, high-power supply input, generate at least one reduced voltage supply, and distribute, via an intermediate distribution plane, the reduced voltage supply to at least one hot-swappable component of the high-power networking device. According to the techniques of this disclosure, the power distribution module may improve reliability, performance, and/or usability of the high-end network device.

According to one example, a network device is described herein. The network device includes at least one chassis and a plurality of hot-swappable networking components distributed within the chassis that require a high-power supply of at least 10,000 watts. The network device further includes a power distribution plane coupled to the hot-swappable networking components distributed within the chassis. The network device further includes a centralized power distribution module (PDM) configured to receive a high-voltage, high-power input supply of at least 10,000 watts and a magnitude of at least 40 volts, generate a reduced voltage, high-power supply of at least 10,000 watts and a magnitude of less than 15 volts, and output the reduced voltage, high-power supply to the centralized power distribution plane for distribution to the plurality of hot-swappable networking components.

According to another example, a method of providing power for components of a high-power network device is described herein. The method includes receiving, by a power distribution module (PDM) of a high-power network device, a high-voltage, high power supply of at least 10,000 watts and a magnitude of at least 40 volts. The method further includes generating, by the power distribution module, a plurality of reduced voltage, high power supplies that are greater than substantially 10,000 watts and have a magnitude of less than 15 volts. The method further includes outputting, by the power distribution module, the plurality of reduced voltage, high power supplies to a centralized power distribution plane for distribution to a plurality of hot-swappable networking components of the high-power network device that require the high-power supply of at least 10,000 watts.

According to another example, a network device is described herein. The device includes means for receiving, by a power distribution module of a high-power network device, a high-voltage, high power supply at least 10,000 watts and a magnitude of at least 40 volts. The device further includes means for generating, by the power distribution module, a plurality of reduced voltage, high power supplies that are greater than substantially 10,000 watts and have a magnitude of less than 15 volts. The device further includes means for distributing the plurality of reduced voltage, high power supplies to a centralized power distribution plane for distribution to a plurality of hot-swappable networking components of the high-power network device that require the high-power supply of at least substantially 10,000 watts.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
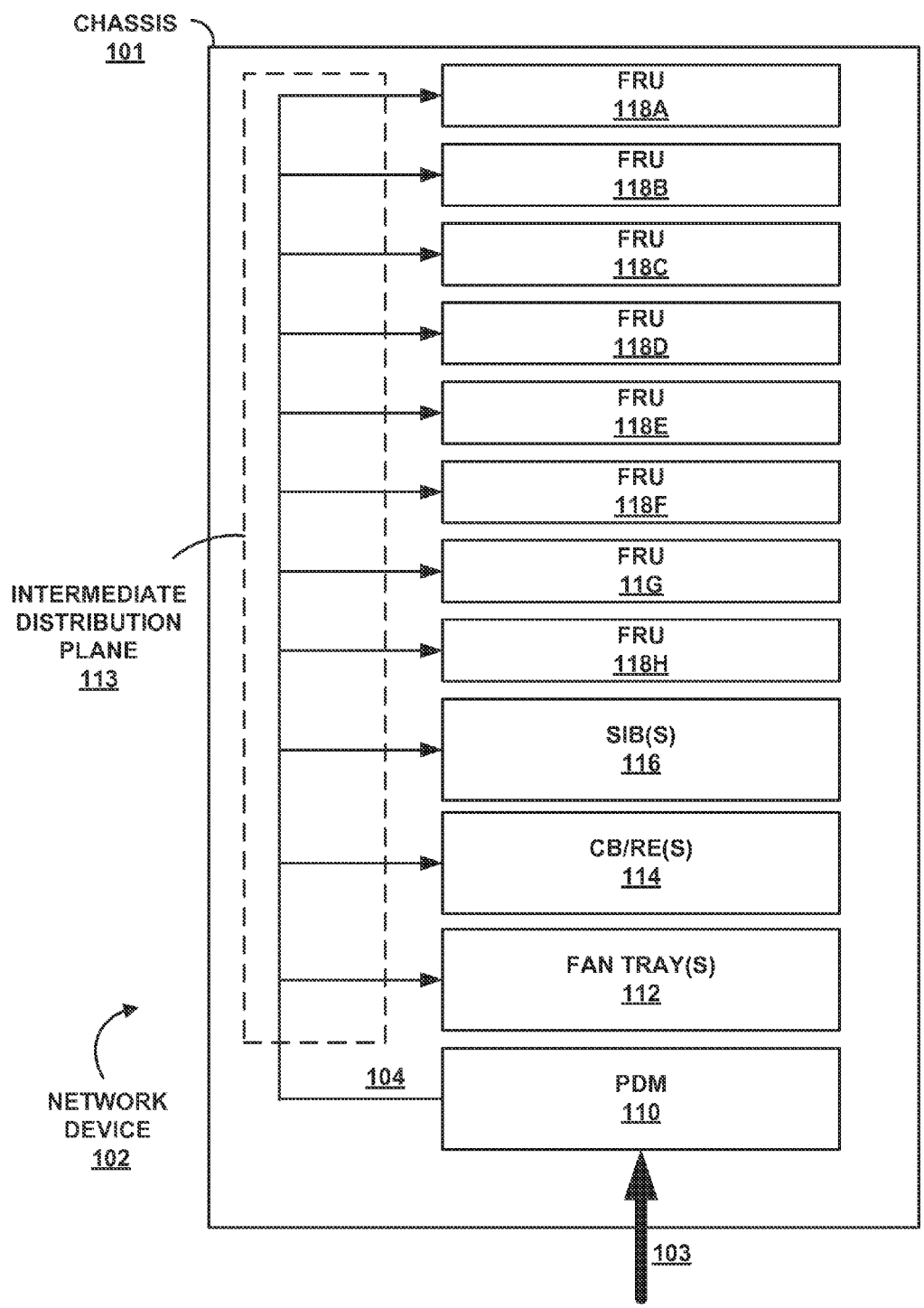
FIG. 1 is a conceptual diagram that illustrates one example of a high power networking device consistent with one or more aspects of this disclosure.

Networking devices may be employed by businesses, service providers, or others to provide networking connectivity that enable communication between computing devices. For example, an Internet services company, such as a web service provider, may utilize such a networking device to provide a back-end server. Such a back-end server may provide storage, computing power, and the like to operate a web site made available to users. According to other examples, a business may employ one or more networking devices to enable communications for computing devices used by employees or others.

In some examples, a networking device may comprise a high-power networking device, such as a core router. In some examples, such a high-power networking device may be configured to operate using a relatively high amount of power compared to other electronic devices. As described herein, the phrase "high-power," when used to refer to a wattage, voltage, or current, refers to a quantity with a level substantially higher than would be used by a typical electronic device, such as a home or small office network router or switch. For example, a high-power networking device may instead require a power supply of over 10,000 watts, such as a power supply of substantially 20,000 watts. According to another example, such a power supply may have a voltage level with a magnitude of at least 30 volts, such as a voltage level between 180 and 240 volts, or a voltage level between −40 and −72 volts.

This disclosure is directed to techniques for distributing supply power for high-power networking components, such as components of a core router. For example, according to the techniques described herein, a high power networking device includes a power distribution module. The power distribution module may be separate from one or more powered components of the high-power networking device. The power distribution module may be configured to receive a high-voltage, high-power input power supply and generate a reduced voltage, high-power power supply. The power distribution module may distribute the reduced voltage, high-power power supply to one or more of the plurality of hot-swappable networking components. The high-power networking components may be configured to use the reduced voltage, high-power power supply for operation.

In some examples, the techniques described herein may provide improvements over other examples of high-power networking devices, where components of the device include or are associated with one or more components configured to manage power. According to such examples, in the case that such power management hardware of a component fails, the component itself may be removed from the networking device and repaired or replaced, which may be expensive and/or inconvenient for a user. For example, while being repaired and/or replaced, such a component may not be used to provide networking functionality.

According to the techniques described herein, a component of a high-power networking device may not necessarily need to be replaced and/or repaired where power management hardware fails or malfunctions. Instead, the power distribution module itself may be replaced and/or repaired in the event of power management hardware failure.

FIG. 1 is a conceptual diagram that depicts one example of a network device 102 consistent with one or more aspects of this disclosure. As shown in FIG. 1, networking device includes at least one chassis 101. As also depicted in FIG. 1, chassis 101 may be configured to hold one or more high-power networking components 111. As depicted in FIG. 1, network device 102 is configured to, via chassis 101, receive a high-voltage, high-power power supply 103. High-power networking components 111 may be configured to operate using a power supply with a lower voltage than the high-voltage, high-power power supply 103. In some examples, network device 102 is a high-end, multi-chassis core router. Further details of an example multi-chassis core router are described in U.S. patent application Ser. No. 11/832,342, entitled "MULTI-CHASSIS ROUTER WITH MULTI-PLEXED OPTICAL INTERCONNECTS," incorporated herein by reference.

According to the example of FIG. 1, chassis 102 is configured to hold a plurality of high-power networking components 111 that include a plurality of field replaceable units (FRU(s)) 118A-118H, one or more switch interface boards (SIBs) 116, one or more command boards (CBs) 114, and/or one or more fan trays 112. The example depicted in FIG. 1 is provided for exemplary purposes only. In other examples, network device 102 may include additional, or different, components than components 111 depicted in FIG. 1. Furthermore, one or more of high-power networking components 111 depicted in FIG. 1 may be combined into a single high-power networking component.

The plurality of FRUs 118A-118H may comprise line cards of network device 102, and may provide network routing functionality of network device 102. The one or more SIBs 116 provide switching functionality of the core router. The one or more control boards (CB) 114, which may also be referred to as one or more "routing engines," manage traffic between the plurality of FRU to facilitate network operations, configuration, and maintenance. The one or more fan trays 112 provide temperature management for network device 102. For example, fan trays 112 may include mechanical fans or one or more other mechanisms for managing a temperature of network device 102, such as liquid cooling and/or one or more heat sinks.

As also shown in FIG. 1, network device 102 further includes at least one centralized power distribution module (PDM) 110 (hereinafter "PDM 110") consistent with the techniques of this disclosure. PDM 110 is configured to distribute supply power to one or more components 111 of high-power network device 102. PDM 110 may be considered "centralized" in that PDM 110 distributes power to more than one of networking components 111. For example, PDM 110 may be configured to distribute power to one or more of FRUs 118A-118H depicted in FIG. 1, as well as at least one of SIBs 116, CBs 114, and/or fan trays 112.

For example, as shown in FIG. 1, PDM 110 is configured receive a high-voltage, high-power power supply 103. PDM 110 may receive the high-voltage power supply 103 with a power level of over 10,000 watts, 20,000 watts or more to meet the requirements of network device 102. In one example, where the high-voltage, high-power supply 103 is received from an alternate current (AC) source, the high-voltage, high-power supply 103 has a voltage of substantially between 180-264 volts. As another example, where the high-voltage, high-power power supply 103 is received from a direct current (DC) source (e.g., a battery), the high-voltage, high-power power supply has a voltage of substantially between −40 and −72 volts. Again, the phrase "high-power" as described herein may refer to any power supply with a wattage, voltage, and/or current substantially greater than a typical power supply of electrical equipment, such as typical low-power networking equipment. In one example, a "high-power" power supply as described herein may have over substantially 10,000 watts, and/or a DC voltage level of at least 30 volts.

As depicted in FIG. 1, PDM 110 receives the high-voltage, high-power supply 103 distribute the reduced voltage, high-power power supplies 104 to high-power, low-voltage components via an intermediate distribution plane 113. For example, as shown in FIG. 1, PDM 110 distributes the reduced voltage, high-power supplies 104 to FRU(s), SIB(s) 116, CB/RE(s) 114, and fan tray(s) 112 via distribution plane 113. In the example of FIG. 1, distribution plane 113 is shown spanning a single chassis. In other examples not depicted in FIG. 1, distribution plane 113 may span multiple chasses.

As described above, components of some high-power networking devices may each include or otherwise be associated with hardware (e.g., power management circuitry) configured to manage a high-voltage, high-power power supply for operation of the respective components of the device. According to these examples, each of the components include one or more of an ORing circuit, a hot-swap circuit, an ESD protection circuit, a step-down converter (e.g., voltage and/or current regulator circuit(s)), and/or any other hardware and/or software component configured to control power specifically for the component. In some examples, components of such a networking device may be required to be spaced apart some distance, due to each of the components receiving the high-voltage, high-power supply.

According to the techniques of this disclosure, high-power components 111 of network device 102 do not include, and are not associated with specific hardware, such as power management circuitry, configured to manage a high-voltage, high-power power supply input for each respective component. Instead, power distribution module 110 operates to distribute the high-voltage, high-power power supply to components 111, including for example FRU(s) 118A-118H, as well as for SIB(s) 116, CB/RE(s) 114, and fan tray(s) 112. In this manner, a complexity of one or more components 111 of networking device 102 (e.g., FRU(s) 118A-118H) may be reduced in comparison to components of a typical networking device. In addition, because PDM 110, not components 111 and/or power management hardware specifically associated with components, is configured to receive the high-voltage, high-power power supply input, spacing requirements for components 111, such as FRU(s) 118A-118H, may be reduced in comparison to other high-power networking devices.

Figure 2:
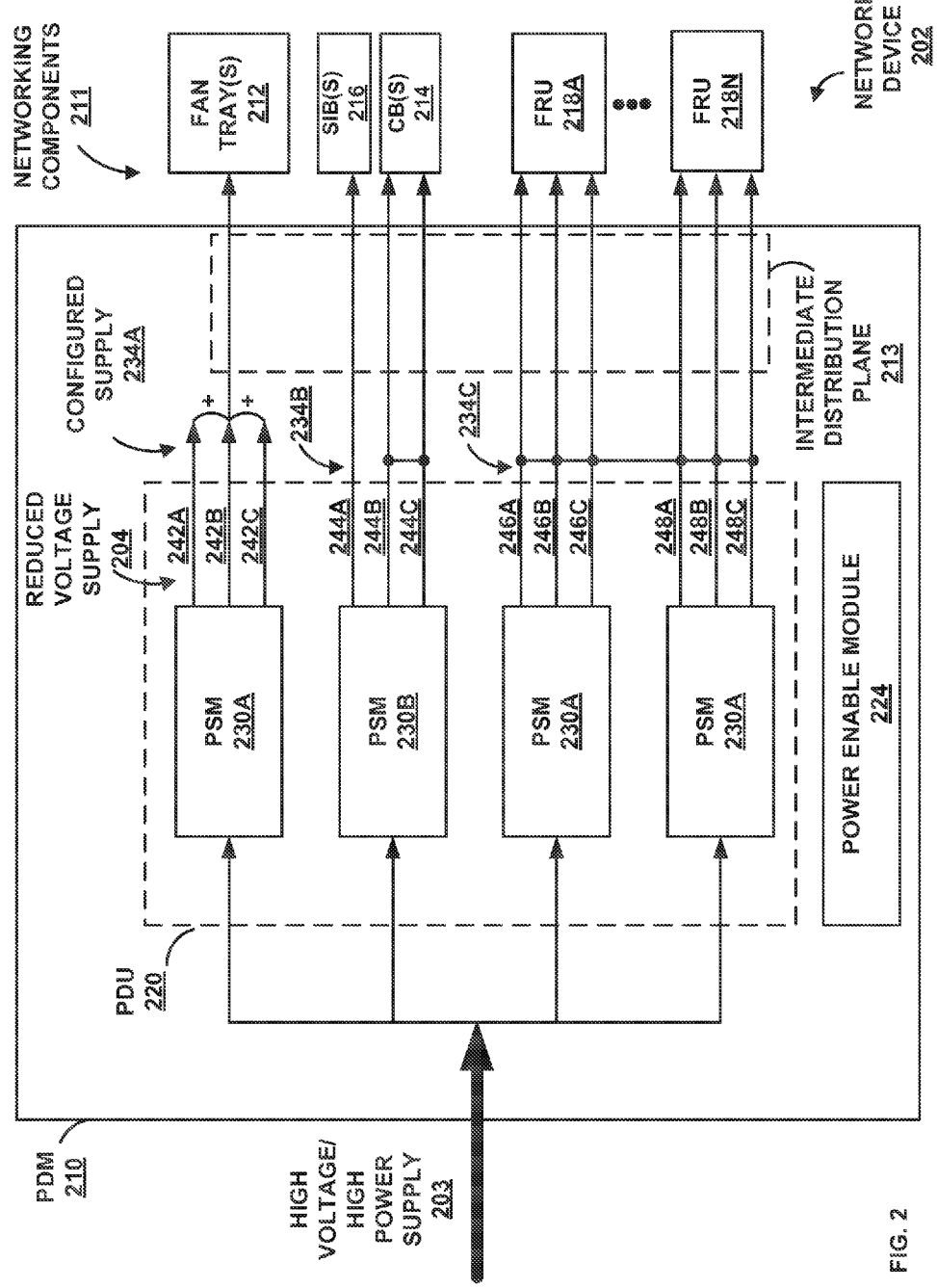
FIG. 2 is a block diagram that illustrates one example of a high power networking device that includes a power distribution module consistent with one or more aspects of this disclosure.

FIG. 2 is a block diagram that illustrates one example of a power distribution module (PDM) 210 of a high-power networking device 202 consistent with one or more aspects of this disclosure. As shown in the example of FIG. 2, PDM 210 is configured to manage power for one or more high-power components 211 of network device 202, including, for example, FRU(s) 218A-218H, SIB(s) 216, CB(s) 214, and/or fan tray(s) 212. PDM 210 receives a high-voltage, high-power power supply 203, generate a plurality of reduced voltage, high-power power supplies 204, and distributes the one or more reduced voltage, high-power power supplies 204 to one or more components 211 of networking device 202 via intermediate distribution plane 213.

According to the example of FIG. 2, PDM 210 includes at least one power distribution unit (PDU) 220 and a power enable module 224. Generally speaking PDU 220 is configured to generate one or more reduced voltage, high power supplies 204. Power enable module 224 controls PDU 220 to provide the one or more reduced voltage, high power supplies 204. For example, power enable module 224 sequence providing one or more reduced voltage, high power supplies 204 to one or more of networking components 211.

As shown in the example of FIG. 2, PDU 220 includes a plurality of power supply modules (PSM) 230A-230D. According to the example of FIG. 2, each of PSM 230A-230D is configured to receive high-voltage, high-power power supply 203, and distribute a plurality of reduced-voltage, high-power power supplies 204 via intermediate distribution plane 213. For example, each of PSM 230A-230D includes one or more hardware modules configured to reduce a voltage of high-voltage, high-power power supply 203, and generate one or more high-power, reduced voltage power supplies 204. In some examples, each of PSM 230A-230D further includes one or more associated Oring transistors, fuses, and/or other circuitry configured to provide one or more reduced voltage power supplies 204 to networking components 211. In some examples, power enable module 224 is configured to control power supplied to such networking components 211, for example using the one or more associated ORing transistors, to turn on or off one or more reduced voltage-high power supplies, for purposes of sequencing, load balancing, or other power management functionality.

In some examples, such as shown in FIG. 2, each of PSM 230A-230D are configured to provide a plurality of high-power, reduced voltage power supplies 204. For example, as shown in FIG. 2, each of PSM 230A-230D includes a plurality of outputs. For example, PSM 230A includes three outputs 242A-242C, PSM 230B includes three outputs 244A-244C, PSM 230C includes three outputs 246A-246C, and PSM 230D includes three outputs 248A-248C. The example of FIG. 2 is provided for exemplary purposes. In other examples, PSM 230A-230D may have a single output, or a different number of output lines than depicted in the example of FIG. 2.

Each of PSM 230A-230D are configured to receive high-voltage supply 203, generate a plurality of reduced voltage supplies 204, and provide the plurality of reduced voltage supplies 204 via the respective outputs. As one specific and non-limiting example, high-voltage supply 203 has a voltage of 48 volts. PSM 230A receive the 48 volt supply 203, generate three 12 volt power supplies, and output the 12 volt power supplies via outputs 242A-242C. In some examples, one or more components 211 of network device 202 are be coupled to receive the generated 12 volt supplies.

In some examples, such as shown in FIG. 2, one or more of PSM 230A-230D are configurable in order to distribute, via intermediate distribution plane 213, different reduced voltage level supplies 204 to different components 211 of network device 202. For example, as shown in the example of FIG. 2, PSM 230A-230D are, in some examples, configurable to generate a configured supply 234A-234D with a voltage level different than a voltage level of the plurality of reduced voltage supplies 204 generated by the respective PSM 230A-230D.

As shown to the example of FIG. 2, PSM 230A-230D are each configured to generate a plurality of (three) reduced voltage supplies 204. In some examples, one or more of the reduced voltage supplies 204 may be provided directly to one or more of networking components 211, for example, where the respective networking component is configured to operate using one or more of the reduced voltage supplies 204. As one example, SIB(s) 216 depicted in FIG. 1 is coupled directly to output 244A. In other examples, two more of the reduced voltage supplies 204 may be combined to generate one or more configured supplies 234A-234D.

For example, to generate such a configured voltage supply 234A-234D, two or more output lines of PSM 230A-230D may be coupled to one another, in parallel or in series. For example, as shown in FIG. 2, PSM 230A include three outputs 242A-242C coupled to one another in series to generate a combined voltage that is three times a reduced voltage 204 of each of outputs 242A-242C. For example, where outputs 242A-242C are each configured to output a reduced voltage supply 204 of 12 volts, outputs 242A-242C' may be coupled to one another in series, to generate a configured voltage 234A of 36 volts. In some examples, such a configured voltage 234A is provided to a networking component 211, such as one or more fan trays 212 as depicted in the example of FIG. 2.

As another example, two or more outputs of PSM 230A-230B may be coupled to one another in parallel to generate a combined voltage 232B, 232C. For example, as shown in FIG. 2, signal lines 244B and 244C are coupled to one another in parallel to generate a configured supply 234C with a voltage level of the reduced voltage supplies 204. According to this example, signal lines 244B and 244C are configured to, in combination, provide the combined supply to one or more of components 211. For example, as shown in FIG. 2, outputs 244B and 244C are coupled in parallel to provide a configured supply voltage 234B to CB(s) 214. In one example, where outputs 244B and 244C generate a reduced voltage 204 of 12 volts, output lines 244B and 244C may be coupled in parallel to generate a configured supply voltage 234B of 12 volts, that may be used by CB(s) 214 depicted in FIG. 2.

In some examples, one or more outputs of different PSM 230A-230D may be coupled to one another generate a configured supply, which may be coupled to supply power to a plurality of components 211 of network device 202. For example, as shown in FIG. 2, each of outputs 246A-246C and 248A-248C of PSM 230C, 230D are coupled to one another in parallel to generate a configured supply 234C provided to a plurality of FRU 218A-218N. The plurality of FRU 218A-218N may comprise any number of FRU. As also shown in FIG. 2, each of outputs 246A-246C and 248A-248C of PSM 230A, 230D are coupled to one another in parallel to provide a configured supply 234C-234D with a voltage level of the reduced voltage supplies 204. As one non-limiting example, where reduced supply voltages 204 comprises a 12 volt supply voltage, outputs 246A-246C and 248A-248C of PSM 230A, 230D coupled to one another in parallel provide, in combination, 12 volt supplies to the plurality of FRU(s) 218A-218N.

As set forth above, in some examples, PSM 240A-240D of PDU 220 are configurable to provide a configured supply voltage 234A-234D to one or more of components 211 that is different than a plurality of reduced supplies 204 output by PSM 240A-240D (i.e., via outputs of the respective PSM 240A-240D). For example, where reduced supply voltages 204 comprises a 12 volt supply voltage, outputs 242A-242C of PSM 230A may be coupled to one another in series to output a configured voltage 234A of 36 volts to power fan tray(s) 212, outputs 244B and 244C of PSM 230B may be coupled to one another in parallel to provide a configured 12 volt supply to CB(S) 214, and outputs 246A-246C and 248A-248C may be coupled to one another in parallel to distribute a configured 12 volt supply to each of FRU 218A-218N.

In some examples, depending on power supply requirements of networking components 211, outputs of PSM 240A-240D may be combined to one another in different ways than depicted in FIG. 2 to generate a configured supply voltage. For example, two signal lines of one or more PSM 240A-240D may be coupled to one another in series to generate a configured voltage of 24 volts, to provide a 24 volt supply to one or more components configured to operate using a 24 volt supply.

The examples depicted in FIG. 2 and described above are provided for exemplary purposes, and are intended to be non-limiting. Examples are provided above where a high-voltage, high power supply 203 received by PDM 210 has a voltage of 48 volts, and where each of PSM 230A-230D generate a plurality of reduced voltage supplies 204 with a voltage of 12 volts, which may be configured to generate different configured voltages 234A-234C, such as a 36 volt supply, a parallel connected 12 volt supply, or any other configured voltage, as described above.

In some examples, PDM 210 is configured to receive an alternating current (AC) high-voltage, high-power supply 203, and distribute a plurality AC or direct current (DC) reduced voltage, high-power supplies 204 to networking components 211. According to other examples, PDM 210 is configured to receive a DC high-voltage, high-power supply 203, and distribute a plurality of AC and/or DC reduced voltage, high-power supplies 204 to networking components 211.

In some examples, PDM 210 are configured to receive a different high-voltage, high-power supply, and PSM 230A-230D are configured to generate a different one or more reduced voltage supplies than those described according to the above examples. Furthermore, the example of FIG. 2 depicts a PDM 210 that includes one PDU 220, which includes four PSM 230A-230D that each include three configurable outputs. In other examples, a PDM 210 as described herein may include more than one PDU. For example, a network device 202 may include one or more PDU dedicated to one or more direct current (DC) power sources, and/or one or more PDU dedicated to one or more alternating current (AC) power sources. In still other examples, outputs of one or more PSM 230A-230D of different PDU of a PDM 210 may be coupled to one another (e.g., via intermediate distribution plane 213) to provide a combined supply, for example as described in more detail below with reference to FIG. 5.

Also, in some examples, a PDU 220 as described herein may include more, or fewer, PSM 230A-230D than depicted in the example of FIG. 2. Furthermore, in some examples, PSM 230A-230D as described herein may include more, or fewer, than the three outputs depicted in the example of FIG. 2.

Figure 3:
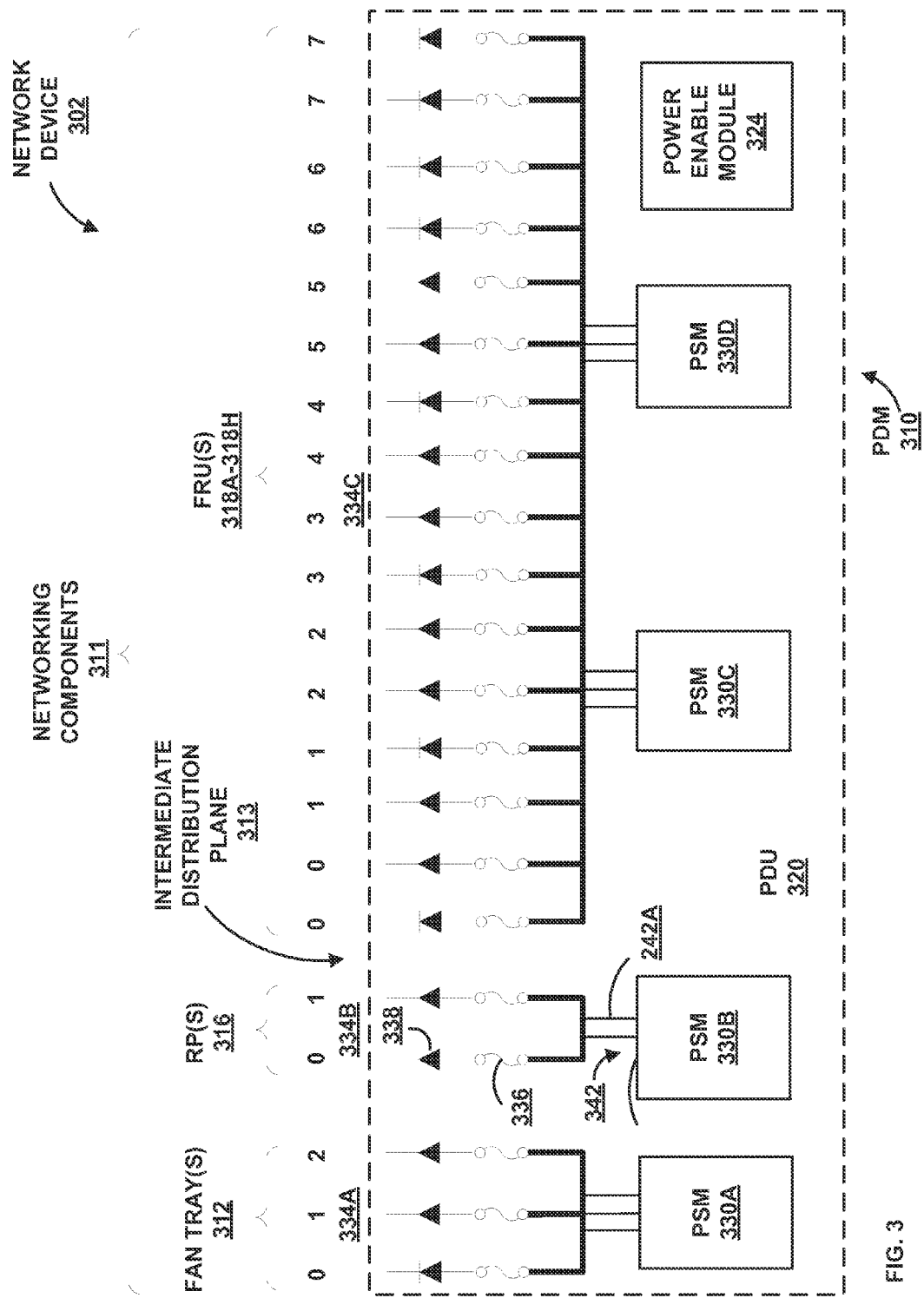
FIG. 3 is a conceptual diagram that illustrates one example a power distribution module consistent with one or more aspects of this disclosure.

FIG. 3 is a conceptual diagram that depicts one example of a PDU 320 of a PDM 310 with one or more aspects of this disclosure. PDU 320 generally corresponds to PDU 220 depicted in FIG. 2. As shown in FIG. 3, PDU 320 includes a plurality of power supply modules (PSM) 330A-330D. As also shown in FIG. 3, each of PSM 330A-330D includes a plurality of outputs 342 configured to generate a reduced voltage supply. As also depicted in FIG. 3, one or more of the plurality of outputs 342 of PSM 330A-330D are associated with power management hardware of PDU 320. For example, as shown in FIG. 3, one or more respective outputs 332 of PSM 330A-33D are associated with a fuse 336 and an ORing transistor 338.

As depicted in FIG. 3, each of PSM 330A-330B may be coupled to fuse 336, which in turn may each be coupled to a respective ORing transistor 338. In some examples, each ORing transistor 338 may be coupled to at least one of a plurality of networking components 311 via intermediate distribution plane 313 to provide a power supply to the component 311. For example, the respective outputs 332 may each be coupled, via intermediate distribution plane 313 to one or more of fan tray(s) 312, RP(s) 316, and/or FRU(s) 318A-318H.

In some examples, fuses 336 depicted in FIG. 3 may protect one or more of components 311 from being damaged and/or disrupted due to surges in current or voltage from PSM 330A-330D. For example, fuses 336 may be configured to trip, or create an open circuit, if a voltage or current level of reduced voltage 332 exceeds a particular threshold. ORing transistors 338 may be used to control power is provided to one or more networking components 311. For example, ORing transistor 338 may be configured to turn on or off in response to a received signal. In some examples, the respective ORing transistors 338 are coupled to and controllable by power enable module 324 depicted in FIG. 3. For example, power enable module 324 may use the respective orient transistors 338 to sequence, load share, or otherwise control power supplied to networking components 311. As one specific example, in response to detecting that a new networking component 311 (e.g., an additional FRU) has been added to network device 302, power enable module 324 is configured to determine whether PDU 320 is capable of supplying power to the new component, and if PDU 320 is capable of supplying power to the new component, supply power to the new component so as to not disrupt other operating components 311 of device 301.

As depicted according to the example of FIG. 3, PSM 330A-330D may be used alone, or in combination, to provide power to one or more of networking components 311 of device 301. For example, as shown in FIG. 3, the three respective outputs of PSM 330A are coupled to one another in series to generate a configured supply voltage 334A comprising power supplies 0, 1, and 2, and distribute the configured supply voltage 334A to one or more fan tray(s) 312 via intermediate distribution plane 313. As one example, where the three respective outputs of PSM 330A are configured to provide 12 volt supplies, the respective outputs may be coupled in series to generate a 36 volt supply to be distributed to one or more fan tray(s) 312 via intermediate distribution plane 313.

As another example, as also shown in FIG. 3, two of the three outputs of PSM 330B are coupled to one another in parallel to generate a configured supply voltage 334B comprising supplies 0 and 1, and provide the configured supply voltage 334B to one or more RP(s) 316. For example, where the three respective outputs of PSM 330B are configured to provide 12 volt supplies, the respective outputs may be coupled in parallel to generate a common 12 volt supply to be provided to one or more RP(s) 316. As also shown in FIG. 3, one of the three outputs of PSM 330B is not used to provide a power supply to any of networking components 311. Instead, the unused output is left floating as depicted in FIG. 3, or coupled to a supply rail (e.g., power or ground).

As another example, as also shown in FIG. 3, three outputs of PSM 330C and the three outputs of PSM 330D are coupled to one another in parallel to generate a configured supply voltage 334C comprising supplies 0, 0, 1, 1, 2, 2, 3, 3, 4, 4, 5, 5, 6, 6, and 7, 7, which are provided to one or more FRU(s) 318A-318H. For example one or more of FRU(s) 318A-318H may be configured to operate using two independent power supplies. According to this example, supplies 0, 0 are provided to a first FRU 318A, supplies 1, 1, are distributed to a second FRU 318B, supplies 2, 2, are distributed to a third FRU 318C, and so on. For example, where the three respective outputs of PSM 330C and 330D are configured to distribute 12 volt supplies, the respective outputs may be coupled in parallel to generate a common 12 volt supply to be distributed to the respective FRU(s) 318A-318H.

As described above, in some examples, a PDM as described herein may include more than one PDU such as PDU 320 depicted in FIG. 3. For example, respective outputs of more than one PDU may be cross-coupled to one another, to distribute a combined power supply to one or more networking components 311.

Figure 4:
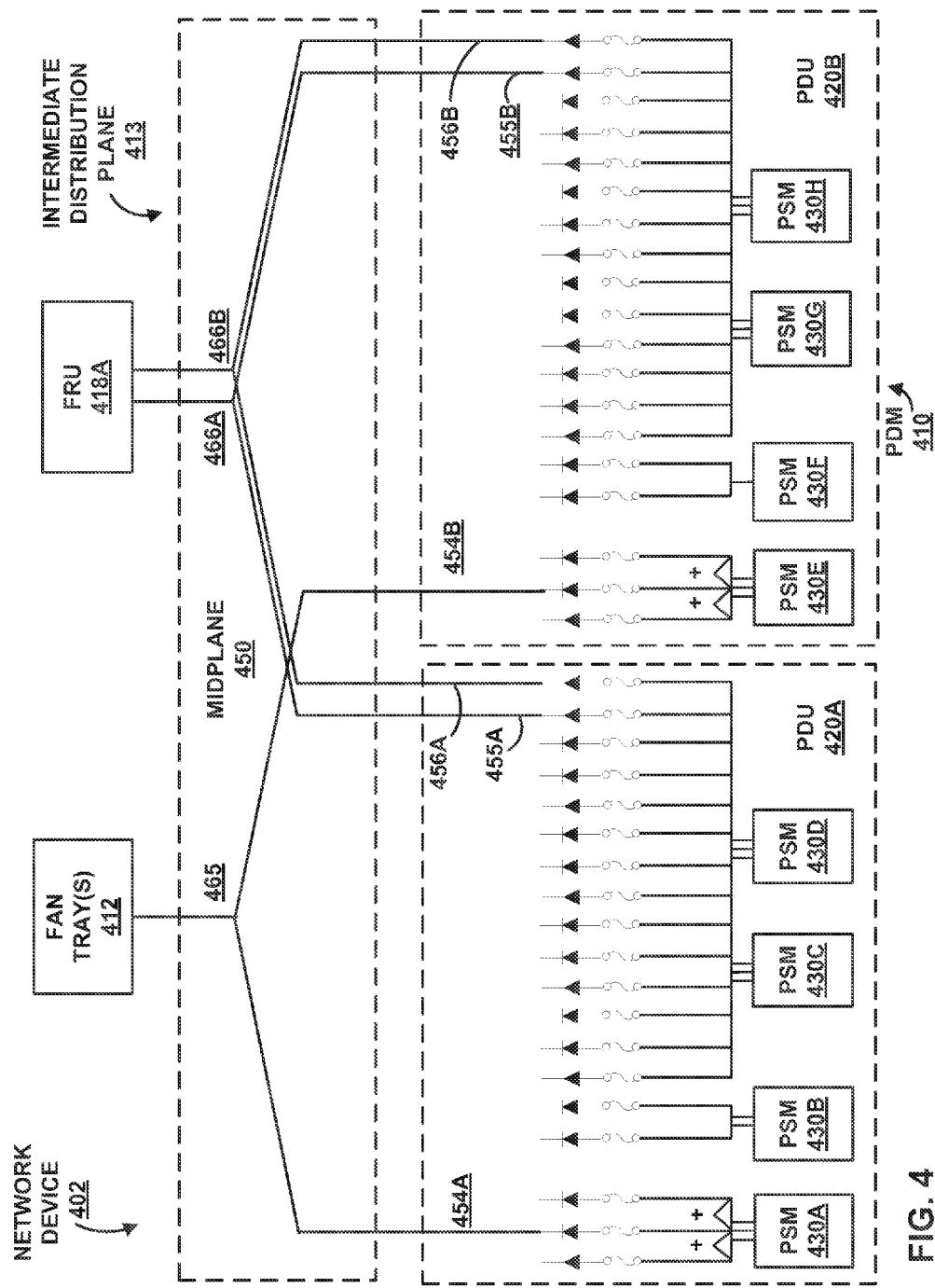
FIG. 4 is a conceptual diagram that illustrates one example of a power distribution module that includes a plurality of power distribution units consistent with one or more aspects of this disclosure.

FIG. 4 is a conceptual diagram that illustrates one example of a power distribution module (PDM) that includes a plurality of power distribution units (PDU) consistent with one or more aspects of this disclosure. According to the examples described with respect to FIG. 3 above, a PDM 310 includes a single PDU 320 that includes a plurality of power supply modules 330A-330B configured to supply power to a plurality of networking components 211. According to the example of FIG. 4, PDM 410 includes a first PDU 420A, and a second PDU 420B. First PDU 420A includes a first plurality of PSM 430A-430D, and second PDU 420B includes a second plurality of PSM 430E-430H.

As depicted in FIG. 4 PDM is configured to distribute reduced-voltage, high-power power supplies to networking components 411 via an intermediate distribution plane that comprises a cross-coupling midplane 450 (hereinafter "midplane 450). Midplane 450 cross couples one or more respective outputs of PDU 420A to one or more respective outputs of PDU 420B. For example, as shown in the example of FIG. 4, outputs of PSM 430A of PDU 420A are coupled to one another (e.g., in series) to generate a first configured voltage 454A, and outputs of PSM 430E of PDU 420B are coupled to one another (e.g., in series) to generate a second configured voltage 454B. Midplane 450 combines first configured supply 454A and second configured supply 454B to one another to generate a combined supply 465. As shown in FIG. 4, combined supply 465 is provided to one or more components 411 of network device 402. For example, as shown in FIG. 4, a combined supply 465 comprising both first configured supply 454A and second configured supply 454B is provided to fan tray(s) 412.

As also depicted in FIG. 4, outputs of PSM 430C and 430D of PDU 420A are coupled to one another (e.g., in parallel) to generate a first configured supply 455A and a second configured supply 456A, and outputs of PSM 430G, 430H of PDU 420B are coupled to one another (e.g., in parallel) to generate a third configured supply 455B and a fourth configured supply 456B. Midplane 450 is configured to combine first configured supply 455A and the third configured supply 455B, to generate a first combined supply 466A. Midplane 450 is also configured to combine second configured supply 456A and fourth configured supply 456B, to generate a second combined supply 466B. As shown in FIG. 4, the first and second combined supplies 466B are distributed to one or more components 411 of network device 402. For example, as shown in FIG. 4, first combined supply 466A and second combined supply are distributed to FRU 418A. In some examples, a reduced voltage, high-power supply may be similarly distributed to other FRU of network device 402 via midplane 450.

For simplicity, the example of FIG. 4 shows power supplies from the respective PDU 420A, 420B cross-coupled via midplane 250 to provide a combined power supply to for two components 411 of network device 402. In other examples, one or more power supplies from the respective PDU 420A, 420B may be cross-coupled to provide a combined power supply to other components of network device 402. For example, power supplies from the respective PDU 420A, 420B may be combined via midplane 250 to provide a combined power supply to one or more of CB(s), SIB(s), and/or other FRU (not depicted in FIG. 4) of network device 402.

As described above, in some examples a high-power networking device as described herein may include a plurality of PDM. For example, a high-power networking device as described herein may include a first PDM configured to manage power from a high power DC supply, and a second PDM configured to manage power from an AC supply. In some such examples, a first PDM may comprise a PDM 210, 310 that includes a single PDU 220, 320 as depicted in the examples of FIGS. 2 and 3. In some such examples, a second PDM may comprise a PDM 410 that includes a plurality of PDU 420A, 420B as depicted in the example of FIG. 4.

In addition, FIG. 4 depicts one example of a PDM 410 that includes two PDU 220A, 220B that each includes four PSM 330A-330D and 330E-330H, respectively. In other examples, a PDM as described herein may include more than two cross-coupled PDU than depicted in the example of FIG. 4. Furthermore, such cross-coupled PDU may include more, or fewer, PSM than depicted in the example of FIG. 4.

Figure 5:
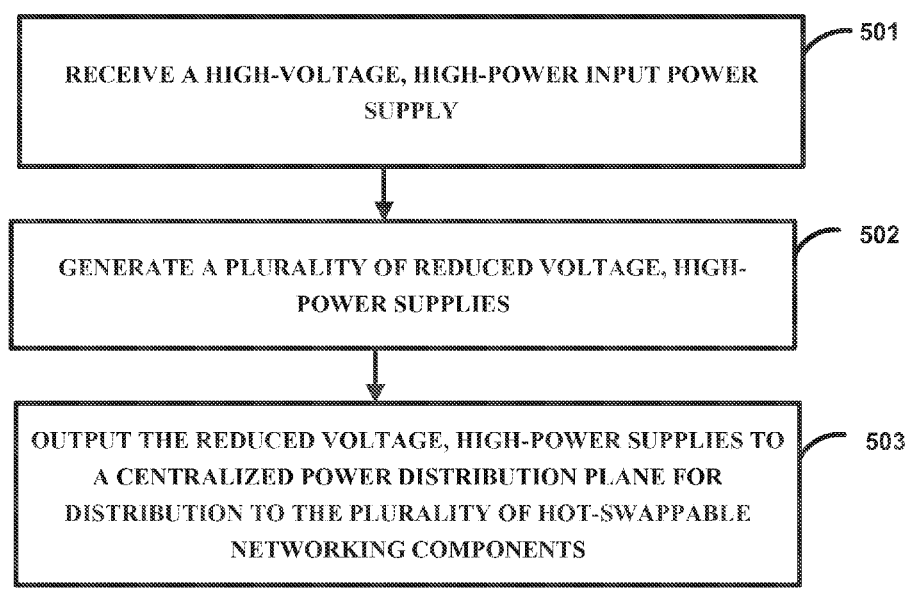
FIG. 5 is a flow diagram that illustrates one example of a method for managing power for one or more components of a high-powered networking device consistent with one or more aspects of this disclosure.

FIG. 5 is a flow diagram that illustrates one example of a method of supplying power to one or more high-power components of a networking device consistent with one or more aspects of this disclosure. The method of FIG. 5 is described as performed by a PDM 110 of a high-power networking device 102 depicted in the example of FIG. 1, however any device may be used to perform the technique of FIG. 5. For example, the method of FIG. 5 may be performed by any of PDM 210, 310, 410 depicted in FIG. 2-4, respectively, as well as any other power distribution module not explicitly depicted or described herein.

As shown in FIG. 5, PDM 110 receives a high-voltage, high-power input supply 103 (501). The high-voltage, high-power input supply has a power level of at least 10,000 watts and a voltage magnitude of greater than 40 volts. As also depicted in FIG. 5, PDM 110 generates a plurality of reduced voltage, high-power supplies 104 (502). The plurality of reduced voltage, high-power supplies 104 plurality of reduced voltage, high-power supplies 104 each have a power level of at least 10,000 watts and a voltage level of less than 20 volts. For example, PDM 110 may include at least one power distribution unit (PDU) 220 that includes at least one power supply module (PSM) 230A-230D. According to this example, each PSM is configured to independent receive the high-voltage, high-power input power supply 203 and generate at least one of the plurality of reduced voltage, high-power supplies 104. In some examples, one or more outputs of the respective PSM are configurable to generate configured supplies, such as configured supplies 234A-234C depicted in FIG. 2.

As also depicted in FIG. 5, PDM 110 distributes the plurality of reduced voltage, high power supplies to a centralized power distribution plane 213 for distribution to a plurality of hot-swappable networking components 211 of a high-power networking device 202 (503). The plurality of hot-swappable networking components 211 may require a high-power supply of at least substantially 10,000 watts.

Various embodiments of the invention have been described. These and other embodiments are within the scope of the following claims.

The invention claimed is:

1. A network device comprising:
   at least one chassis;
   a plurality of hot-swappable networking components distributed within the chassis that require a high-power supply of at least 10,000 watts, the plurality of hot-swappable networking components comprising a first set of networking components and a second, different set of networking components;
   a power distribution plane coupled to the hot-swappable networking components distributed within the chassis; and
   a centralized power distribution module (PDM) comprising at least one power distribution unit (PDU) for providing distributed power to the networking components, the at least one PDU comprising:
      a plurality of power supply modules (PSMs) including a first PSM and a second PSM,
      wherein the first PSM and the second PSM are configured to receive a high-voltage, high-power input supply of at least 10,000 watts and a magnitude of at least 40 volts,
      wherein the first PSM is configured to:
         generate a first reduced voltage, high-power supply of at least 10,000 watts and a magnitude of less than 15 volts from the high-voltage, high power input supply; and
         output the first reduced voltage, high-power supply to the centralized power distribution plane for distribution to the first set of networking components and not to the second set of networking components, and
      wherein the second PSM is configured to:
         generate a second reduced voltage, high-power supply of at least 10,000 watts and a magnitude of less than 15 volts from the high-voltage, high power input supply; and
         output the second reduced voltage, high-power supply to the centralized power distribution plane for distribution to the second set of networking components and not to the first set of networking components.

2. The device of claim 1, wherein the at least one PDU is a first PDU, and wherein the PDM further includes a second PDU, and wherein the centralized power distribution plane further comprises:
   a cross-coupling midplane configured to cross-couple at least one supply from the first PDU with at least one supply from the second PDU to generate a combined supply; and
   output the combined supply to at least one of the plurality of hot-swappable networking components.

3. The device of claim 2, wherein the plurality of PSMs comprise a first plurality of PSMs, wherein the first PDU includes the first plurality of PSMs, and wherein the second PDU includes a second plurality of PSMs, and wherein the cross-coupling midplane is configured to combine an output of one of the first plurality of PSMs and an output of one of the second plurality of PSMs to generate the combined supply.

4. The device of claim 1, wherein the high-voltage, high-power input power supply comprises an alternating current (AC) power supply with a voltage level between substantially 180V and substantially 264 volts,
   wherein the first PSM is configured to output the first reduced voltage, high-power supply to the first set of networking components with a voltage of substantially 12 volts, and
   wherein the second PSM is configured to output the second reduced voltage, high-power supply to the second set of networking components with a voltage of substantially 12 volts.

5. The device of claim 1, wherein the high-voltage, high-power input power supply comprises a direct current (DC) power supply with a voltage level between substantially negative 40 volts and substantially negative 72 volts,
   wherein the first PSM is configured to output the first reduced voltage, high-power supply to the first set of networking components with a voltage of substantially 12 volts, and
   wherein the second PSM is configured to output the second reduced voltage, high-power supply to the second set of networking components with a voltage of substantially 12 volts.

6. The device of claim 1, further comprising a power enable module, wherein the power enable module is configured to selectively enable the power distribution module to provide the distributed power to the networking components.

7. The device of claim 1, wherein the plurality of hot-swappable networking components comprise:

at least one field replaceable unit (FRU) of the network device; and
other component of the plurality of hot-swappable networking components.

8. The device of claim 7, wherein the at least one other component of the plurality of hot-swappable networking components comprises one or more components selected from the group consisting of:
a switch interface board of the network device;
a command board of the network device; and
a fan tray of the network device.

9. A method of providing power for components of a high-power network device, comprising:
receiving, by a first power supply module (PSM) and a second PSM of a plurality of PSMs of at least one power distribution unit (PDU) of a power distribution module (PDM) of a high-power network device, a high-voltage, high power supply of at least 10,000 watts and a magnitude of at least 40 volts;
generating, by the first PSM, a first reduced voltage, high power supply that is greater than substantially 10,000 watts and has a magnitude of less than 15 volts;
generating, by the second PSM, a second reduced voltage, high power supply that is greater than substantially 10,000 watts and has a magnitude of less than 15 volts;
outputting, by the first PSM, the first reduced voltage, high power supply to a centralized power distribution plane for distribution to a first set of networking components of a plurality of hot-swappable networking components of the high-power network device that require the high-power supply of at least 10,000 watts, and not to a second set of networking components of the plurality of hot-swappable networking components; and
outputting, by the second PSM, the second reduced voltage, high power supply to the centralized power distribution plane for distribution to the second set of networking components of the plurality of hot-swappable networking components of the high-power network device that require the high-power supply of at least 10,000 watts, and not to the first set of networking components of the plurality of hot-swappable networking components.

10. The method of claim 9, wherein the at least one PDU is a first PDU, and wherein the PDM further includes a second PDU, and further comprising:
cross-coupling, via a cross-coupling midplane, at least one supply from the first PDU with at least one supply from the second PDU to generate a combined supply; and
outputting the combined supply to at least one of the plurality of hot-swappable networking components.

11. The method of claim 10, wherein the plurality of PSMs comprise a first plurality of PSMs, wherein the first PDU includes the first plurality of PSMs, and wherein the second PDU includes a second plurality of PSMs, and further comprising:
cross-coupling an output of one of the first plurality of PSM and an output of one of the second plurality of PSM to generate the combined supply.

12. The method of claim 9, wherein the high-voltage, high-power input power supply comprises an alternating current (AC) power supply with a voltage level between substantially 180V and substantially 264 volts,
wherein outputting, by the first PSM, the first reduced voltage, high-power supply comprises outputting, by the first PSM, the first reduced voltage, high-power supply to the first set of networking components with a voltage of substantially 12 volts, and
wherein outputting, by the second PSM, the second reduced voltage, high-power supply comprises outputting, by the second PSM, the second reduced voltage, high-power supply to the second set of networking components with a voltage of substantially 12 volts.

13. The method of claim 9, wherein the high-voltage, high-power input power supply comprises a direct current (DC) power supply with a voltage level between substantially negative 40 volts and substantially negative 72 volts,
wherein outputting, by the first PSM, the first reduced voltage, high-power supply comprises outputting, by the first PSM, the first reduced voltage, high-power supply to the first set of networking components with a voltage of substantially 12 volts, and
wherein outputting, by the second PSM, the second reduced voltage, high-power supply comprises outputting, by the second PSM, the second reduced voltage, high-power supply to the second set of networking components with a voltage of substantially 12 volts.

14. The method of claim 9, further comprising
selectively enabling, via a power enable module, the PDM to provide distributed power to the networking components.

15. The method of claim 9, wherein the plurality of hot-swappable networking components comprise:
at least one field replaceable unit (FRU) of the network device; and
other component of the plurality of hot-swappable networking components.

16. The method of claim 15, wherein the at least one other component of the plurality of hot-swappable networking components comprises one or more components selected from the group consisting of:
a switch interface board of the network device;
a command board of the network device; and
a fan tray of the network device.

17. A network device, comprising:
means for receiving, by a first power supply module (PSM) and a second PSM of a plurality of PSMs of at least one power distribution unit (PDU) of a power distribution module (PDM) of a high-power network device, a high-voltage, high power supply at least 10,000 watts and a magnitude of at least 40 volts;
means for generating, by the first PSM, a first reduced voltage, high power supply that is greater than substantially 10,000 watts and has a magnitude of less than 15 volts;
means for generating, by the second PSM, a second reduced voltage, high power supply that is greater than substantially 10,000 watts and has a magnitude of less than 15 volts;
means for outputting, by the first PSM, the first reduced voltage, high power supply to a centralized power distribution plane for distribution to a first set of networking components of a plurality of hot-swappable networking components of the high-power network device that require the high-power supply of at least 10,000 watts, and not to a second set of networking components of the plurality of hot-swappable networking components; and
means for outputting, by the second PSM, the second reduced voltage, high power supply to the centralized power distribution plane for distribution to the second set of networking components of the plurality of hot-swappable networking components of the high-power network device that require the high-power supply of at least 10,000 watts, and not to the first set of networking components of the plurality of hot-swappable networking components.

18. The device of claim 17, wherein the at least one PDU is a first PDU, and wherein the PDM further includes a second PDU, and further comprising:
  means for cross-coupling, via a cross-coupling midplane, at least one supply from the first PDU with at least one supply from the second PDU to generate a combined supply; and
  means for outputting the combined supply to at least one of the plurality of hot-swappable networking components.

19. The device of claim 18, wherein the plurality of PSMs comprise a first plurality of PSMs wherein the first PDU includes the first plurality of PSMs, and wherein the second PDU includes a second plurality of PSMs, and further comprising:
  means for cross-coupling an output of one of the first plurality of PSM and an output of one of the second plurality of PSM to generate the combined supply.

20. The device of claim 17, wherein the high-voltage, high-power input power supply comprises an alternating current (AC) power supply with a voltage level between substantially 180V and substantially 264 volts,
  wherein the means for outputting, by the first PSM, the first reduced voltage, high-power supply comprises means for outputting, by the first PSM, the first reduced voltage, high-power supply to the first set of networking components with a voltage of substantially 12 volts, and
  wherein the means for outputting, by the second PSM, the second reduced voltage, high-power supply comprises means for outputting, by the second PSM, the second reduced voltage, high-power supply to the second set of networking components with a voltage of substantially 12 volts.

21. The device of claim 17, wherein the high-voltage, high-power input power supply comprises a direct current (DC) power supply with a voltage level between substantially negative 40 volts and substantially negative 72 volts,
  wherein the means for outputting, by the first PSM, the first reduced voltage, high-power supply comprises means for outputting, by the first PSM, the first reduced voltage, high-power supply to the first set of networking components with a voltage of substantially 12 volts, and
  wherein outputting, by the second PSM, the second reduced voltage, high-power supply comprises outputting, by the second PSM, the second reduced voltage, high-power supply to the second set of networking components with a voltage of substantially 12 volts.

22. The device of claim 17, further comprising
  means for selectively enabling, via a power enable module, the PDM to provide distributed power to the networking components.

23. The device of claim 17, wherein the plurality of hot-swappable networking components comprise:
  at least one field replaceable unit (FRU) of the network device; and
  other component of the plurality of hot-swappable networking components.

24. The device of claim 23, wherein the at least one other component of the plurality of hot-swappable networking components comprises one or more components selected from the group consisting of:
  a switch interface board of the network device;
  a command board of the network device; and
  a fan tray of the network device.

25. The network device of claim 1, wherein the first PSM comprises a first set of fuses coupled to the first set of networking components, wherein the first PSM outputs the first reduced voltage to the first set of networking components via the first set of fuses, wherein the second PSM comprises a second set of fuses coupled to the second set of networking components, wherein the second PSM outputs the second reduced voltage to the second set of networking components via the second set of fuses.

* * * * *